C. T. BERG.
CANDLE HOLDER.
APPLICATION FILED FEB. 25, 1918.

1,289,368.

Patented Dec. 31, 1918.

Witnesses.
A. H. Opsahl
E. C. Wells

Inventor.
Christian T. Berg.
By his Attorneys
Williamson Merchant

UNITED STATES PATENT OFFICE.

CHRISTIAN T. BERG, OF MINNEAPOLIS, MINNESOTA.

CANDLE-HOLDER.

1,289,368.

Specification of Letters Patent.

Patented Dec. 31, 1918.

Application filed February 25, 1918. Serial No. 219,063.

*To all whom it may concern:*

Be it known that I, CHRISTIAN T. BERG, a citizen of the United States, residing at Minneapolis, in the county of Hennepin and State of Minnesota, have invented certain new and useful Improvements in Candle-Holders; and I do hereby declare the following to be a full, clear, and exact description of the invention, such as will enable others skilled in the art to which it appertains to make and use the same.

My invention has for its object to provide an improved candle holding bracket especially adapted for application to Christmas trees, and to such ends generally stated, the invention consists of the novel construction and combination of parts hereinafter described and defined in the claims.

In the accompanying drawings which illustrate the invention, like characters indicate like parts throughout the several views.

Referring to the drawings.

Figure 1:
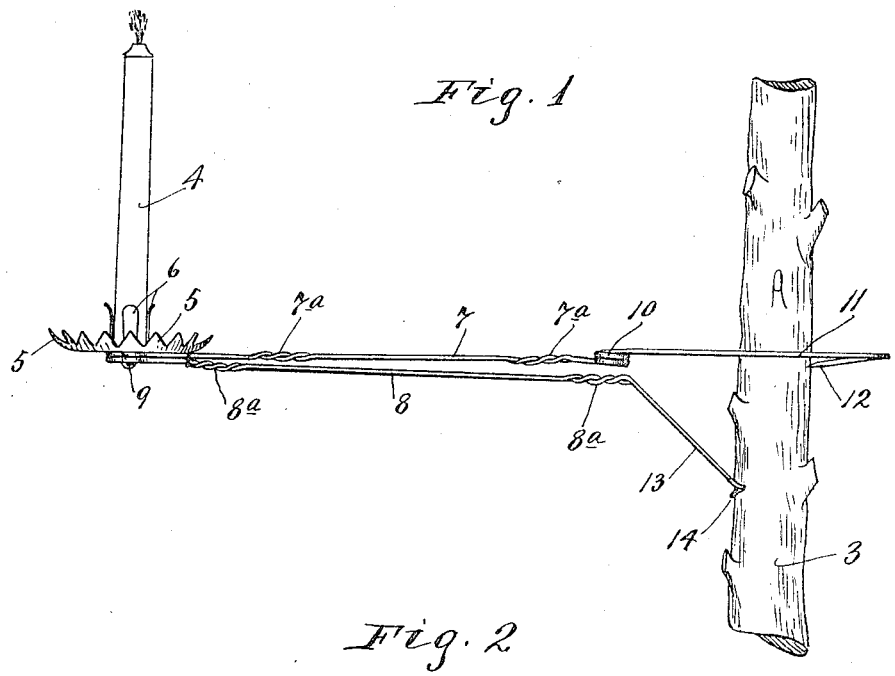
Figure 1 is a side elevation illustrating the invention applied to the trunk of a tree.

The tree trunk is indicated by the numeral 3 and the candle is indicated by the numeral 4. The candle stick proper comprises a small base 5 and spaced upwardly projecting candle holding spring prongs 6 secured to said base in a position to hold the candle in an upright position.

The bracket is formed from a single piece of wire bent upon itself to form a two strand upper arm 7 and a two strand lower arm 8. The strands of the arm 7 are twisted together at 7ª and the strands of the arm 8 are twisted together at 8ª. At their outer ends the two arms are united and rigidly secured centrally to the bottom of the base 5 by a rivet 9 or other suitable means.

The two strands of the upper arm 7 adjacent to the inner twist 7ª are bent to form spring coils 10, and from these two coils the two strands are extended to form anchoring fingers 11 that are back turned upon themselves, and formed with sharp points that afford anchoring fingers 12. The strands of the lower arm 8 beyond the inner twist 8ª are extended to form a trussing leg 13 that has a curved bearing portion 14 for direct engagement with the trunk of the tree.

The candle supporting bracket is adapted to be applied to the trunk of a tree as shown in the drawings, by referring to which it will be noted that the anchoring arms 11 straddle and embrace the tree trunk and that the barbs 12 then hook into and engage the trunk so as to prevent the said anchoring fingers from being drawn or forced from the tree trunk. The trussing leg 13 by engagement with the tree trunk at the front or the side opposite to the points of engagement of the barbs with the trunk, securely hold the bracket in a horizontal position securely projected from the body of the tree trunk.

A multiplicity of these candle supporting brackets may be applied to a Christmas tree, for example, and projected properly among the branches so as to support the candles at desired points, and candles thus supported will be unaffected by movements of the limbs of the tree, and there will be no danger of the candles being accidentally moved from position. Danger of fire is thus prevented and, moreover, the candles may be very easily and quickly applied to, or removed from the tree. In practice the candle supporting brackets will be made in various different lengths so as to support the different candles in positions varying in distance from the tree trunk.

Figure 2:
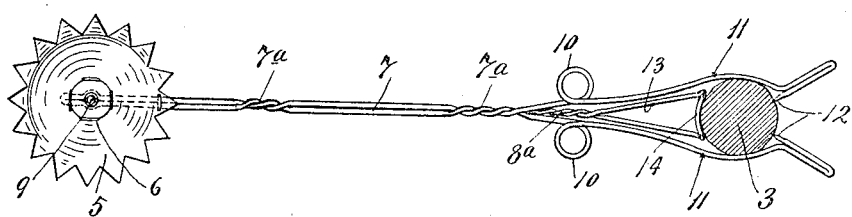
Fig. 2 is a plan view of the candle holding bracket, the trunk of the tree being in section.

It will be noted by reference to Fig. 2 that the folded outer ends of the anchoring arms 11 diverge so that the bracket may be fastened to a tree trunk when engaged only by its outer or candle supporting end, simply by forcing the diverging inner ends against the tree trunk so as to cause the fingers to straddle the trunk.

The bracket may be made at small cost and is highly desirable for the purposes had in view. The wire portion of the so-called candle supporting bracket is preferably made from spring steel wire.

What I claim is:

1. A candle supporting bracket constructed of spring wire comprising four strands twisted together to form upper and lower arms, the strands of said upper arm at their inner ends being extended and bent to form spring loops and anchoring fingers which fingers terminate in diverging ends and trunk engaging barbs, and the strands of said lower arm being extended downwardly at an oblique angle in the form of a loop that affords a trunk engaging trussing leg.

2. A candle supporting bracket constructed of spring wire comprising four strands twisted together to form upper and lower arms, the strands of said upper arm at their inner ends being extended and bent to form spring loops and anchoring fingers which fingers terminate in diverging ends and trunk engaging barbs, the strands of said lower arm being extended downwardy at an oblique angle in the form of a loop that affords a trunk engaging trussing leg, and a candle stick proper secured to and supported by the outer ends of the said two arms.

In testimony whereof I affix my signature in presence of two witnesses.

CHRISTIAN T. BERG.

Witnesses:
CLARA DEMAREST,
BERNICE G. BAUMANN.

Copies of this patent may be obtained for five cents each, by addressing the "Commissioner of Patents, Washington, D. C."